March 20, 1945.  W. G. HARDING  2,371,991
REINFORCED TUBE
Filed May 7, 1943
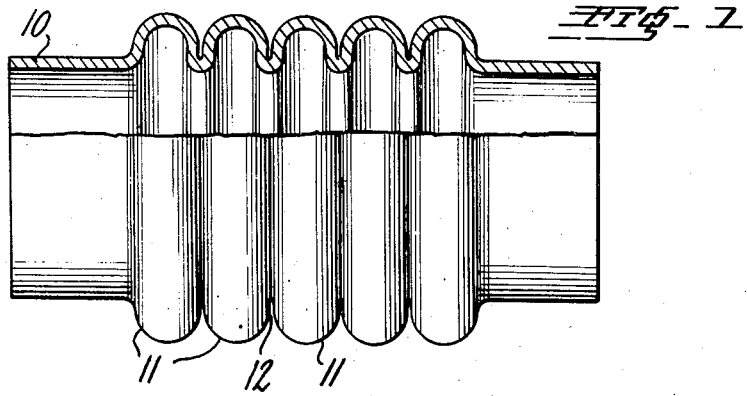
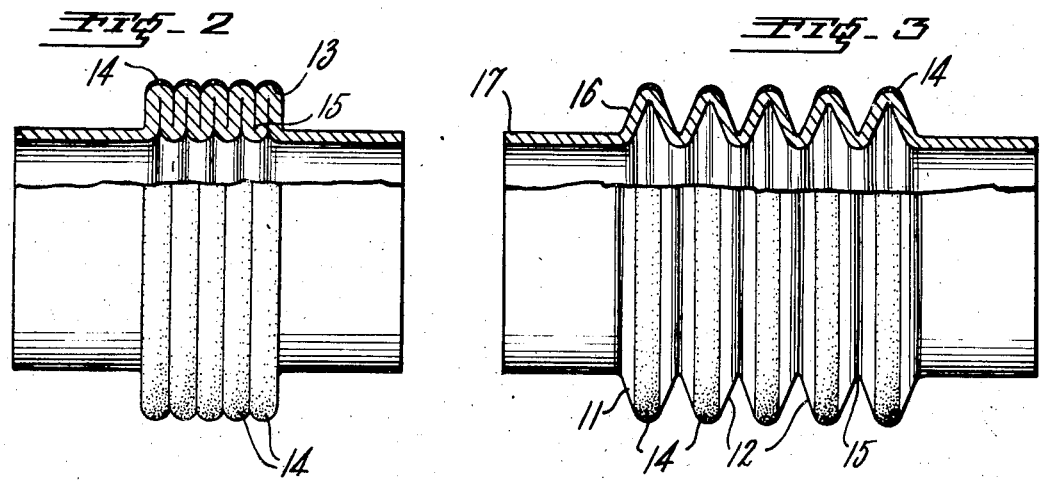
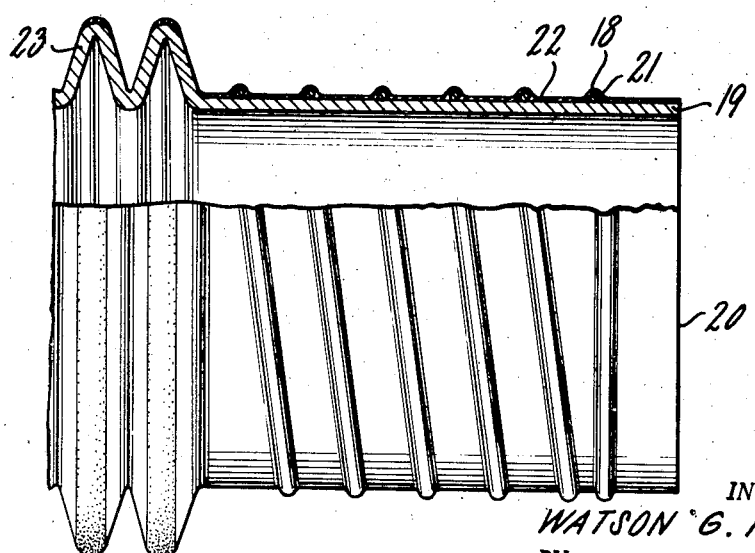
INVENTOR.
WATSON G. HARDING
BY
ATTORNEY Patented Mar. 20, 1945

2,371,991

UNITED STATES PATENT OFFICE 2,371,991

REINFORCED TUBE

Watson G. Harding, Fairlawn, N. J., assignor to United States Rubber Company, New York, N. Y., a corporation of New Jersey Application May 7, 1943, Serial No. 486,003

5 Claims. (Cl. 138—76)

This invention relates to an improved tube which is made from a relatively flexible fibrous carcass provided with circumferential ridges either in the form of corrugations or spirally wrapped strands which are treated with a stiffening agent to increase the resistance of the tube to inwardly directed forces. The invention relates particularly to a light-weight corrugated tube in which the carcass is made from flexible asbestos fibers and the tops of the corrugations are treated with a heat resistant stiffening agent so as to produce a longitudinally collapsible and axially flexible heat resistant tube. The invention also relates to the method of making such tubes, and to the combination of the spiral and corrugated ridged constructions.

Heretofore plain or corrugated tubes having flexible carcasses have been reinforced with metallic wire spirally wound within, or around the carcass, or incorporated therein so as to increase its resistance to inwardly directed forces. The use of such reinforcing materials of high specific gravity increases the weight of the tube, and the wire is more difficult to incorporate than the stiffening agent employed in the tube embodying the present invention.

In accordance with the present invention the tube is made from a flexible fibrous carcass, preferably asbestos fibers so as to render the tube non-inflammable and heat resistant, but where a non-combustible tube is not required, other types of fibers, such as cotton may be used. The carcass is made preferably from what is known as "bare back" fabric, that is a fabric having one face treated with a flexible coating, such as rubber or other plastic, to render the fabric non-porous, and the other face left bare. The tube is formed with the bare face on the outside and after being formed, it is provided with external circumferential ridges which are treated with a stiffening agent, which penetrates the bare face and when dried increases the resistance of the tube to inwardly directed forces. Preferably such stiffening agent is non-inflammable and heat resistant. The ridges may be formed on the carcass by spirally winding one or more fibrous strands around it, or the ridges may be formed by corrugating the tube circumferentially. If a high degree of non-inflammability is desired the strands are made of asbestos. Where the fibrous strands are used, a coating of the stiffening agent is applied to the strands and over that portion of the carcass so as to cement them to the carcass and thereby increase its resistance to radial deformation and to flexing transversely. Where the carcass is provided with circumferential corrugations, only the ridges or tops of the corrugations are coated with the stiffening agent to increase their resistance to radial deformation by inwardly directed forces. The valleys between the ridges are left free from the coating so that the flexible carcass can be longitudinally collapsed and flexed transversely in respect to its axis.

The spirally wound construction and the corrugated construction may be employed in different portions of the same continuous tube for the purpose of increasing its resistance to transverse bending in the spirally wound portions and maintaining flexibility in the corrugated portions, while increasing its resistance to radial deformation throughout. A tube so constructed is of relatively light-weight, and where the carcass is made of the asbestos material, and the stiffening agent used is fire-proof, a relatively light-weight fireproof tube is produced.

The foregoing objects and other advantages of this invention are further described in greater detail in the following description and the accompanying drawing, in which:

Fig. 1 is a side view of a tube, shown partially in longitudinal cross-section, and illustrating an intermediate step in the production of the corrugated tube embodying this invention;

Fig. 2 is a view of the tube shown in Fig. 1, but illustrating an advanced step in the process, wherein the corrugations shown in Fig. 1 have been longitudinally collapsed in close relation to one another;

Fig. 3 is a view of the tube shown in Fig. 2, and illustrating the completed tube embodying this invention; and Fig. 4 is a side view shown partially in longitudinal cross-section, and illustrating a modification of this invention, which may be used separately or in connection with the form of the invention as shown in Figs. 1 to 3.

In the several forms of the invention illustrated and described herein, the carcass can be made from a woven fibrous material, such as asbestos cloth, which is cut into strips and folded longitudinally into a tube so that the longitudinal edges overlap. The overlapping edges are then cemented together.

The carcass of the tube being thus formed may be provided with corrugations, as illustrated in Fig. 1, in accordance with the method described in my co-pending application Serial No. 394,278, filed May 20, 1941, now Patent No. 2,347,101, dated April 18, 1944, or any other convenient method may be used, such as shown in United States Patent No. 1,271,455. The carcass 10 may be provided with any desired number of corrugations 11. After the corrugations are formed, the corrugated portions of the tube are longitudinally collapsed until the adjacent walls 12 of the corrugations are brought in close proximity to one another, as shown in Fig. 2. In accordance with the method disclosed in my said application, the corrugations may be brought into close proximity with one another as each corrugation is successively formed.

While the corrugations are held in such position, the external ridges 13 are coated with a stiffening agent, which when dried forms a relatively hard and compression resistant coating of reinforcing material 14. During the application of the stiffening agent the walls 12 are held tightly together so as to prevent the coating from flowing into the valleys 15 between the walls 12 and coat them. They are then separated at once while wet to prevent sticking together. The stiffening agent may be applied with a brush in the form of a spreadable liquid or it may be sprayed on. The coating is thereafter dried to a hard condition, and the tube may be elongated and set in the position shown in Fig. 3, with the adjacent walls of the corrugations separated the desired distance. The tube thus constructed is capable of being collapsed longitudinally, and also of being bent axially by virtue of the adjacent walls 12, particularly at the bottom of the valleys 15, being flexible and free from the stiffening agent, whereas, the resistance of the tube to being collapsed by inwardly directed forces is increased by the reinforcing stiffening agent 14. Furthermore, as the materials of which the tube is made are relatively light in weight, a very light tube is produced, which is of extreme importance for use in aircraft.

The completed tube 16 as shown in Fig. 3 may be provided with uncorrugated or non-ridged portions 17 for the purpose of connecting the tubes to other channels or ducts. Also the tubes 16 may be provided with corrugated sections which are spaced from one another by uncorrugated sections 17. The purpose of such construction is to provide the tubes with flexibility in certain portions and to provide them with stiffness in other portions, as in the smooth sections 17, which may also be coated with a stiffening agent to increase their rigidity, or such latter sections may be reinforced by the spirally wound construction now to be described.

A modification of the invention is shown in Fig. 4 in which ridges 18 are provided on the external surface of the carcass 19 of the finished tube 20. The ridges 18 are formed by spirally winding a fibrous strand 21 around the carcass 19. The outer surface of the carcass 19 and the strand 21 is coated with a stiffening agent 22 which reinforces the carcass 19 and cements the strand 21 thereto. The coated strand 21 reinforces the carcass against being collapsed by inwardly directed forces, and such construction is useful in constructions where longitudinal collapsibility and axial bending is not required. This construction may be used to reinforce the relatively non-flexible end connections for the corrugated tubes, or to reinforce the uncorrugated portions which may extend between two corrugated sections, and is illustrated in Fig. 4 in this connection, wherein a corrugated section 23 is formed on the section reinforced with the spirally wound fibrous strand 21.

For the purpose of this invention the following stiffening agents have been found to be suitable:

*Example 1.*—A phenol aldehyde liquid coating material, which is known in the trade as Bakelite varnish, sold under the trade name BV-1680 by Bakelite Corporation having offices at 30 East 42nd Street, New York, N. Y.

*Example 2.*—

|  | Parts by weight |
|---|---|
| Cellulose acetate (54.2% acetic acid content) softening point 249° C. | 12 |
| Isophorone (to slow evaporation and thus prevent blistering) | 1 |
| Denatured ethyl alcohol | 8.7 |
| Acetone | 78.3 |
|  | 100.0 |

The above coating materials may be applied with a brush. The material in Example 1 may also be sprayed on and after drying at room temperature it is baked at a temperature of 300° F. for 2 hours. Tubes made of asbestos and treated with the last mentioned Bakelite varnish coating will withstand continuous heat of 350° F., and will not become unfavorably brittle at temperatures as low as 80° F. below zero.

Whereas several forms of this invention have been described herein, it will be understood that modifications of some of the details can be made without departing from the spirit of the invention and the scope of the appended claims. For example, this invention is not limited to the application of the stiffening agent to a "bare back" fabric as described herein, but the stiffening agent may be applied to other surfaces, such as the ridged surface of a rubber tube, with a lesser stiffening effect due to lack of penetration of the agent.

Having thus described my invention, what I claim and desire to protect by Letters Patent is:

1. A light-weight tube adapted to resist inwardly directed forces, said tube having a carcass comprising flexible fibrous material, said carcass having circumferential corrugations formed therein, the outer surfaces of the ridges of said corrugations having a relatively thick coating of stiffening material adhered thereto and adapted to increase the stiffness of said ridges and their resistance to deformation by inwardly directed forces, and the valleys in said carcass between said ridges being free from said thick coating and relatively flexible.

2. A light-weight, heat resistant tube adapted to resist inwardly directed forces, said tube having a carcass formed of asbestos fibers, said carcass having circumferential corrugations formed therein, the ridges of said corrugations being treated with a heat resistant stiffening agent to increase the resistance of the tube to inwardly directed forces, and said carcass between said ridges being substantially free from said stiffening material and remaining in a relatively flexible condition.

3. A light-weight heat resistant tube adapted to resist inwardly directed forces, said tube having a carcass formed of asbestos fibers, said carcass having circumferential corrugations formed therein, the ridges of said corrugations having applied thereto a coating of phenol-aldehyde condensation product converted from the liquid to the solid infusible state, said coating being sufficiently thick and rigid to increase the resistance of said tubes to deformation by inwardly directed forces, and said carcass material in the valleys between said ridges remaining in a flexible condition.

4. A light-weight heat resistant tube adapted to resist inwardly directed forces, said tube having a carcass formed of woven asbestos fibers, said carcass having circumferential corrugations formed therein, the ridges only of said corrugations having applied thereto a coating of phenol-formaldehyde condensation product converted from the liquid to the solid infusible state, said coating being sufficiently rigid to increase the resistance of said tube to deformation by radial forces, and said carcass material in the valleys between said ridges being free from said coating and remaining in a flexible condition.

5. A light-weight tube adapted to resist inwardly directed forces, said tube having a longitudinally collapsible section and an adjacent section adapted to resist being collapsed longitudinally, both of said sections being formed from a flexible carcass of fibrous material, said carcass of said longitudinally collapsible section having circumferential corrugations formed therein, the ridges only of said corrugations being treated with a stiffening agent and the valleys therebetween being substantially free of said stiffening agent and remaining in a flexible condition, said adjacent longitudinally collapsible resistant section having a fibrous strand of material spirally wound around it, and said strand and the carcass on which it is wound being coated and cemented together with a coating of stiffening material.

WATSON G. HARDING.